(No Model.) 2 Sheets—Sheet 1.
M. G. HUBBARD, Jr.
BRAKE HANDLE.
No. 582,822. Patented May 18, 1897.
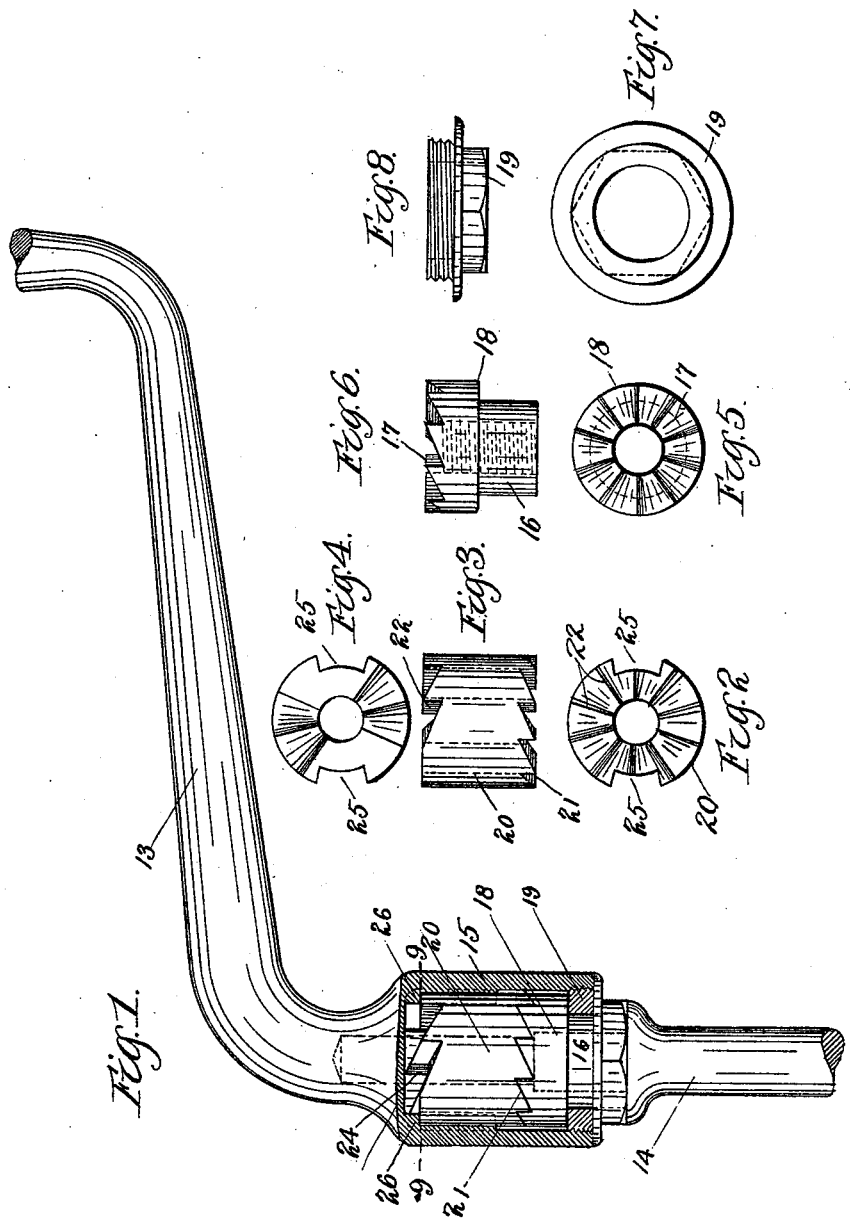
WITNESSES:
INVENTOR
Moses G. Hubbard Jr.
BY
ATTORNEY.

(No Model.) 2 Sheets—Sheet 2.
M. G. HUBBARD, Jr.
BRAKE HANDLE.
No. 582,822. Patented May 18, 1897.
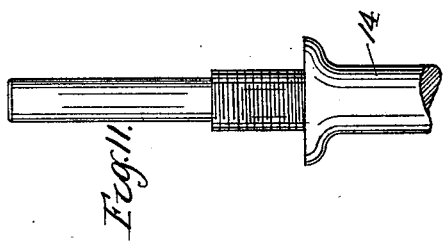
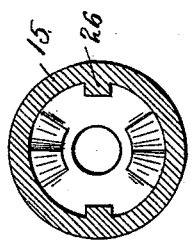
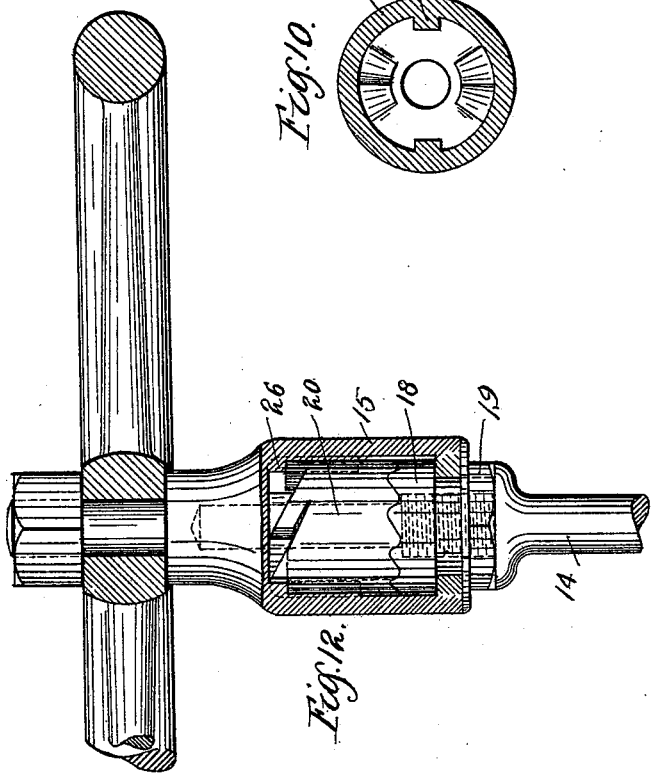
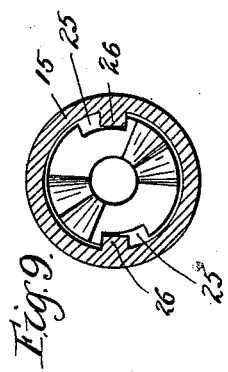
WITNESSES:
Samuel E. Hibben.
Holmes A. Tilden.
INVENTOR
Moses G. Hubbard Jr.
BY
Bond Adams Pickard & Jackson
ATTORNEY.

UNITED STATES PATENT OFFICE.

MOSES G. HUBBARD, JR., OF CHICAGO, ILLINOIS, ASSIGNOR TO THE McGUIRE MANUFACTURING COMPANY, OF SAME PLACE.

BRAKE-HANDLE.

SPECIFICATION forming part of Letters Patent No. 582,822, dated May 18, 1897.

Application filed February 1, 1897. Serial No. 621,477. (No model.)

*To all whom it may concern:*

Be it known that I, MOSES G. HUBBARD, Jr., a citizen of the United States, residing in Chicago, in the county of Cook and State of Illinois, have invented certain new and useful Improvements in Brake-Handles, of which the following is a specification, reference being had to the accompanying drawings, in which—

Figure 1 is a side elevation of a brake-handle mounted upon the brake-staff, part being in section. Fig. 2 is an under side view of the clutch-hub. Figs. 3 and 4 are side and plan views, respectively, of the same. Figs. 5 and 6 are plan and side views, respectively, of the staff-head. Figs. 7 and 8 are plan and side views, respectively, of the screw-cap which secures the brake-handle upon the staff. Fig. 9 is a cross-section on line 9 9 of Fig. 1, looking down. Fig. 10 is a cross-section on line 9 9 of Fig. 1, looking up. Fig. 11 is a view of the upper end of the brake-staff. Fig. 12 is a view of the brake-handle, part being in section to show my improvements as applied to a ratchet brake-handle in which the ratchet-teeth connecting the handle to brake-staff have become worn or rounded off.

My invention relates to ratchet brake-handles; and it consists in providing a new and improved brake-handle which is so constructed as to prevent the slipping of the ratchet handles or wheels on account of the wearing away of the ratchet-teeth or from other causes.

The advantages of ratchet brake-handles are well known, but as heretofore constructed they require constant careful inspection to prevent the danger of accidents on account of the slipping of the ratchets. In service the working faces of the brake-handle wear off at an angle with the line of the brake-staff and the points of the teeth become rounded, so that when power is applied to set the brakes, the teeth being held in engagement with each other by spring-pressure only, they slip out of engagement and the brake-staff is not rotated. Consequently the brakes are set only slightly, if at all, and if this occurs in an emergency a collision or wreck is the result. To keep the ratchet-teeth in proper working order, so as to secure approximate safety, considerable expense is entailed. I overcome these objections by making the engagement of the ratchet-teeth one which is positive and substantially unyielding when the handle is operated to set the brakes, but which is nevertheless yielding on the reverse movement of the brake-handle, so that the handle may be reversely moved on the staff.

In the form of my invention illustrated in the accompanying drawings the brake-handle is arranged to operatively engage the brake-staff by means of an interposed ratchet or clutch hub, which by rotation of the brake-handle in one direction is positively forced and unyieldingly held in locking engagement with the brake-staff, but upon reverse rotation of the brake-handle is released from such downward pressure, so that it may rotate upon the head of the brake-staff; and as such clutch-hub is connected to the brake-handle rotation of the brake-handle in the proper direction consequently rotates the brake-staff.

Referring to the drawings for a more particular description of my invention, 13 indicates the brake-handle, and 14 indicates the brake-staff. As shown in Fig. 1, the handle 13 is provided with a hollow shell 15, into which the upper end of the brake-staff is fitted.

16 indicates a head provided with ratchet-teeth 17 on its upper surface and adapted to fit upon the brake-staff 14. The brake-staff and head 16 are preferably screw-threaded, as illustrated in the drawings, so that said head may be screwed upon the staff; but the head may be otherwise secured upon the staff, if desired, provided it is so secured that the staff will rotate with said head when said head is rotated by means of its ratchet-teeth. The head 16 is further provided with a peripheral shoulder 18, as shown in Fig. 6, the object of which is to permit the brake-handle to be locked upon the staff by means of a cap 19, which fits upon the upper end of the brake-staff and screws into the lower portion of the shell 15, said cap abutting against the shoulder 18, as shown in Fig. 1.

20 indicates a clutch or ratchet hub which in the construction shown is adapted to fit over the upper end of the brake-staff and to rest upon the head 16. The hub 20 is provided at its lower end with ratchet-teeth 21, adapted to mesh with the teeth 17 of the head 16. Said hub is further provided at its upper end with one or more recesses 22, as shown in Figs. 3 and 4, said recesses being adapted to receive a corresponding number of ratchet-teeth or cams 24, carried by the brake-handle 13, as shown in Fig. 1. It will be noted that the teeth or cams 24 project farther than the ratchet-teeth 17 21, the object of which is to permit vertical movement of the hub 20 sufficient to clear the teeth 17, and consequently permit reverse movement of the brake-handle, as will be hereinafter more fully set forth. As shown in Figs. 2 and 4, the hub 20 is provided with one or more (preferably two) vertical grooves or channels 25 in its periphery, which are adapted to receive a corresponding number of lugs or splines 27, carried by the brake-handle, as shown in Fig. 1. By this construction the brake-handle and the hub 20 are locked together, although movement to a certain extent of the brake-handle independently of the hub is permitted.

The operation of my improved brake-handle is as follows: The parts being assembled, when the brake-handle is to be operated to set the brake it is rotated in the proper direction, bringing the teeth or cams 24 to the position shown in Fig. 1, and consequently the hub 20 will be forced down positively into engagement with the brake-staff head 16, and will be held there unyieldingly as long as pressure is applied to the brake-handle. To release the brake, all that it is necessary to do is to move the brake-handle back slightly, so that the teeth 24 may project into the recesses 22 on the upper end of the hub, when, as the teeth 17 do not project as far as the teeth 24, the hub may rise sufficiently to clear the teeth 17, permitting reverse movement of the brake-staff. The operation of my improved brake-handle when the brake-staff teeth have been worn off to rounded form, as shown in Fig. 12, is equally as good as before, inasmuch as by the positive engagement of the hub 20 with the head, even slight projections, whether rounded or angular, are sufficient to lock the hub and head together, so that the brake-staff may be rotated to set the brakes without danger of slipping. By my improvements, therefore, the life of the locking parts is almost infinitely increased, as the ratchet-teeth require no attention and may be used until they are almost entirely worn off.

While the construction shown is that which I consider the best adapted for general use, I do not wish to be limited to such construction, as various modifications may be made without departing from my invention.

That which I claim as my invention, and desire to secure by Letters Patent, is—

1. The combination with a shaft having a series of teeth upon one portion thereof, of a rotatably-mounted handle, a movable member mounted in said handle, and means for automatically and positively forcing said movable member into engagement with the teeth on said shaft by the rotation of the said handle, substantially as described.

2. The combination with a shaft, of a toothed head carried thereby, a handle journaled on said shaft, a movable member adapted to engage the teeth of said head, and means automatically operated by the rotary movement of said handle for positively forcing said movable member into engagement with the teeth on said head when said handle is moved in one direction only, whereby said shaft and handle are positively locked together for rotating said shaft in one direction only, substantially as described.

3. The combination of a shaft having a series of teeth upon one portion, a wheel or crank journaled on said shaft, a movable member mounted in said wheel or crank, and one or more cams actuated by the movement of said wheel or crank to positively force and maintain the engagement of said movable member with said teeth, substantially as and for the purpose specified.

4. In a brake-handle, the combination with a brake-staff having a series of teeth at the upper portion thereof, a brake-handle having a shell embracing the upper end of said staff and adapted to rotate thereupon, a movable piece engaging the teeth carried by said staff, and means carried by the brake-handle for positively forcing said movable piece into engagement with said brake-staff and locking it unyieldingly in such engagement when the handle is operated to apply the brake, and permitting the disengagement of said movable piece from said brake-staff when the handle is reversely operated, substantially as described.

5. In a ratchet brake-handle, the combination with a brake-staff having a toothed head, of a handle having a shell for embracing said head, and being journaled on said staff, a movable clutch-hub mounted in said shell and adapted to engage said toothed head, said clutch-head having a limited vertical and rotary movement independently of said shell, and means for positively forcing said hub into engagement with said staff-head, substantially as described.

6. The combination with a brake-staff, of a handle, and automatic mechanism positively actuated to lock said handle and staff together by the rotation of the handle to set the brake, and for unlocking said staff from the handle by the reverse motion of the handle, substantially as described.

7. The combination with a brake-staff, of a handle, and automatic mechanism positively actuated to positively and unyieldingly lock said handle and staff together by the rotation of the handle to set the brake, and for automatically unlocking said staff from said handle by the reverse motion of the latter, substantially as described.

8. The combination with a brake-staff, of a rotatable handle, an intermediate device for locking the handle and staff together, means for automatically locking the intermediate device for locking the handle and staff positively and unyieldingly together when said handle is rotated in one direction and means operated by the rotation of the handle in the reverse direction for releasing said intermediate device, substantially as described.

9. The combination with a brake-staff, and teeth carried thereby, of a handle, an intermediate device adapted to lock said handle and staff together, means automatically operated by the rotary movement of the brake-handle to lock said intermediate device, handle and staff positively together when the handle is moved in one direction, and means for unlocking said parts when the handle is moved in another direction, substantially as described.

10. The combination with a brake-staff, and teeth carried thereby, of a handle mounted upon said staff, a clutch-hub between said handle and staff, said hub being movable longitudinally of said staff and having teeth adapted to engage the teeth of said staff, and means operated by the rotation of the handle in one direction to positively hold said hub in engagement with said brake-staff, substantially as described.

11. The combination with a brake-staff, and teeth carried thereby, of a handle mounted upon said staff, a clutch-hub between said handle and staff, said hub being movable longitudinally of said staff and having teeth adapted to engage the teeth of said staff, and a cam carried by the handle and acting, when said handle is rotated in one direction, to positively hold said hub in engagement with said brake-staff, substantially as described.

12. The combination with a brake-staff, and teeth carried thereby, of a handle mounted upon said staff, a clutch-hub between said handle and staff, said hub being movable longitudinally of said staff and having teeth adapted to engage the teeth of said staff, a cam carried by the handle and acting, when said handle is rotated in one direction, to positively hold said hub in engagement with said brake-staff, and means for releasing said hub when the handle is moved in the opposite direction, substantially as described.

13. The combination with a brake-staff, and teeth carried thereby, of a handle mounted upon said staff, a clutch-hub between said handle and staff, said hub being movable longitudinally of said staff and having teeth adapted to engage the teeth of said staff, a cam carried by the handle and acting, when said handle is rotated in one direction, to positively hold said hub in engagement with said brake-staff, and means for releasing said hub when the handle is moved in the opposite direction, said handle having a limited rotary movement independently of said hub, substantially as described.

14. The combination with a brake-staff, and teeth carried thereby, of an intermediate hub arranged upon said staff and adapted to engage the teeth of said staff, said hub having a recess 25, a brake-handle having a shell, a lug carried thereby and adapted to enter said recess 25, and a cam carried by said handle and adapted to hold said hub in locking engagement with said staff when the handle is rotated in one direction, and to release said hub when the handle is rotated in the opposite direction.

15. The combination with a brake-staff, and a toothed head mounted thereupon and secured thereto, of a hub having teeth adapted to engage the teeth of said head, a recess 22 at its upper end, a brake-handle having a shell adapted to receive said hub, and a cam adapted to enter the recess 22 of said hub, substantially as described.

16. The combination with a brake-staff, and a toothed head mounted thereupon and secured thereto, of a hub having teeth adapted to engage the teeth of said head, a recess 22 at its upper end, a brake-handle having a shell adapted to receive said hub, and a cam adapted to enter the recess 22 of said hub, said shell having a lug 26 adapted to enter a recess 25 in said hub, substantially as described.

MOSES G. HUBBARD, JR.

Witnesses:
A. H. ADAMS,
JOHN L. JACKSON.